United States Patent
Miresmailli

(10) Patent No.: US 12,197,219 B2
(45) Date of Patent: Jan. 14, 2025

(54) MOBILE PLATFORM FOR CROP MONITORING AND TREATMENT

(71) Applicant: Ecoation Innovative Solutions Inc., North Vancouver (CA)

(72) Inventor: Saber Miresmailli, North Vancouver (CA)

(73) Assignee: Ecoation Innovative Solutions Inc., North Vancouver (CA)

( * ) Notice: Subject to any disclaimer, the term of this patent is extended or adjusted under 35 U.S.C. 154(b) by 1161 days.

(21) Appl. No.: 16/990,212

(22) Filed: Aug. 11, 2020

(65) Prior Publication Data

US 2021/0048822 A1    Feb. 18, 2021

Related U.S. Application Data

(60) Provisional application No. 62/885,448, filed on Aug. 12, 2019.

(51) Int. Cl.
*A01M 7/00* (2006.01)
*A01B 69/04* (2006.01)
(Continued)

(52) U.S. Cl.
CPC ......... *G05D 1/0212* (2013.01); *A01B 69/008* (2013.01); *A01M 7/0042* (2013.01);
(Continued)

(58) Field of Classification Search
CPC .... G05D 1/0212; G05D 1/0094; B01F 33/84; B01F 2101/04; A01B 69/008;
(Continued)

(56) References Cited

U.S. PATENT DOCUMENTS

| 4,171,710 A | 10/1979 | Boynton et al. |
| 4,755,942 A | 7/1988 | Gardner et al. |

(Continued)

FOREIGN PATENT DOCUMENTS

| CN | 102541030 A | 7/2012 |
| DE | 10148747 A1 | 4/2003 |

(Continued)

OTHER PUBLICATIONS

First Office Action dated Mar. 30, 2023 in connection with Chinese Patent Application No. 202080057316.8, 33 pages.

(Continued)

*Primary Examiner* — Chee-Chong Lee

(57) ABSTRACT

A mobile crop monitoring and treatment system includes a vehicle with a propulsion system and multiple sensors mounted on the vehicle. Each sensor is configured to capture data pertaining to at least one plant-related parameter when the sensor is positioned proximate to a plant in a crop. The system also includes a storage system configured to house multiple treatment agents, including at least one chemical pesticide and at least one biological control agent, on-board the vehicle. The system further includes an application system configured to apply one or more of the treatment agents to the plant. In addition, the system includes a controller configured to control movement of the vehicle and operation of the sensors and application system. The controller is configured to cause the application system to apply one or more treatment agents to the plant in response to one or more signals from one or more sensors.

20 Claims, 8 Drawing Sheets

(51) Int. Cl.
*B01F 33/84* (2022.01)
*B25J 5/00* (2006.01)
*G05D 1/00* (2006.01)
*B01F 101/04* (2022.01)

(52) U.S. Cl.
CPC ........ *A01M 7/0085* (2013.01); *A01M 7/0092* (2013.01); *B01F 33/84* (2022.01); *B25J 5/00* (2013.01); *G05D 1/0094* (2013.01); *B01F 2101/04* (2022.01)

(58) Field of Classification Search
CPC .............. A01M 7/0042; A01M 7/0085; A01M 7/0092; B25J 5/00
USPC ...................................................... 239/146
See application file for complete search history.

(56) References Cited

U.S. PATENT DOCUMENTS

| | | |
|---|---|---|
| 4,876,647 A | 10/1989 | Gardner et al. |
| 5,130,545 A | 7/1992 | Lussier |
| 5,839,106 A | 11/1998 | Bellegarda |
| 5,884,224 A | 3/1999 | McNabb et al. |
| 6,397,162 B1 | 5/2002 | Ton |
| 6,573,512 B1 | 6/2003 | Lucia et al. |
| 6,657,117 B2 | 12/2003 | Weare et al. |
| 6,701,665 B1 | 3/2004 | Ton et al. |
| 7,112,806 B2 | 9/2006 | Lussier |
| 7,412,330 B2 | 8/2008 | Spicer et al. |
| 7,487,925 B2 | 2/2009 | Skinner |
| 7,617,057 B2 | 11/2009 | May et al. |
| 7,715,013 B2 | 5/2010 | Glaser et al. |
| 7,911,517 B1* | 3/2011 | Hunt, Jr. ................ G06V 20/38 348/272 |
| 7,987,632 B2 | 8/2011 | May et al. |
| 8,027,770 B2* | 9/2011 | Poulsen ................ A01M 21/04 701/50 |
| 8,028,470 B2* | 10/2011 | Anderson .............. A01G 25/09 47/79 |
| 8,061,080 B2 | 11/2011 | Loebl et al. |
| 8,160,782 B2* | 4/2012 | Harrison, Jr. .......... A01G 25/16 701/50 |
| 8,249,308 B2 | 8/2012 | Lussier |
| 8,265,835 B2* | 9/2012 | Peterson ............. A01M 7/0089 701/50 |
| 8,319,165 B2* | 11/2012 | Holland ............... A01B 79/005 382/110 |
| 8,417,534 B2* | 4/2013 | Belzer .................... G06Q 50/02 705/7.41 |
| 8,437,498 B2 | 5/2013 | Malsam |
| 8,437,879 B2 | 5/2013 | Anderson |
| 8,476,603 B2 | 7/2013 | Moise et al. |
| 8,504,234 B2 | 8/2013 | Anderson |
| 8,836,504 B2 | 9/2014 | Kohler et al. |
| 9,532,411 B2 | 12/2016 | Conrad et al. |
| 9,576,786 B2 | 2/2017 | Greenberg et al. |
| 9,939,132 B2 | 4/2018 | Greenberg et al. |
| 9,992,991 B2 | 6/2018 | Cink et al. |
| 10,021,837 B2 | 7/2018 | Greenberg et al. |
| 10,241,097 B2 | 3/2019 | Miresmailli et al. |
| 10,339,380 B2 | 7/2019 | Greenberg et al. |
| 10,627,785 B2 | 4/2020 | King et al. |
| 10,635,274 B2 | 4/2020 | Greenberg et al. |
| 10,701,852 B2 | 7/2020 | Calleija et al. |
| 10,791,037 B2 | 9/2020 | Greenberg et al. |
| 10,929,664 B2 | 2/2021 | King |
| 10,949,974 B2 | 3/2021 | King et al. |
| 11,003,456 B2 | 5/2021 | King |
| 11,062,516 B2 | 7/2021 | Greenberg et al. |
| 2002/0167587 A1 | 11/2002 | Ogasawara |
| 2002/0170229 A1 | 11/2002 | Ton et al. |
| 2003/0229497 A1 | 12/2003 | Wilson et al. |
| 2004/0241635 A1 | 12/2004 | Buckley |
| 2008/0083779 A1 | 4/2008 | Saravanane et al. |
| 2011/0101239 A1 | 5/2011 | Woodhouse et al. |
| 2011/0261355 A1 | 10/2011 | Hannel et al. |
| 2012/0046837 A1 | 2/2012 | Anderson |
| 2012/0101861 A1 | 4/2012 | Lindores |
| 2012/0109387 A1 | 5/2012 | Martin et al. |
| 2012/0114187 A1 | 5/2012 | Duarte |
| 2012/0150355 A1 | 6/2012 | Anderson |
| 2012/0150357 A1 | 6/2012 | Kline et al. |
| 2014/0035752 A1 | 2/2014 | Johnson |
| 2014/0059722 A1 | 2/2014 | Krichevsky |
| 2014/0064568 A1 | 3/2014 | Moon et al. |
| 2014/0180549 A1 | 6/2014 | Siemens et al. |
| 2014/0222374 A1 | 8/2014 | Lock et al. |
| 2015/0015697 A1 | 1/2015 | Redden et al. |
| 2015/0027040 A1 | 1/2015 | Redden |
| 2017/0030877 A1 | 2/2017 | Miresmailli et al. |
| 2017/0032258 A1 | 2/2017 | Miresmailli et al. |
| 2017/0176595 A1 | 6/2017 | McPeek |
| 2017/0332544 A1 | 11/2017 | Conrad et al. |
| 2017/0359943 A1 | 12/2017 | Calleija et al. |
| 2018/0082362 A1 | 3/2018 | Greenberg et al. |
| 2018/0082375 A1 | 3/2018 | Greenberg et al. |
| 2018/0108123 A1 | 4/2018 | Baurer et al. |
| 2019/0098842 A1 | 4/2019 | Barber, III et al. |
| 2019/0170718 A1 | 6/2019 | Miresmailli et al. |
| 2020/0380616 A1 | 12/2020 | King et al. |
| 2021/0298244 A1 | 9/2021 | King et al. |
| 2021/0302973 A1 | 9/2021 | King et al. |
| 2021/0304216 A1 | 9/2021 | King et al. |
| 2021/0304326 A1 | 9/2021 | Greenberg et al. |

FOREIGN PATENT DOCUMENTS

| | | |
|---|---|---|
| EP | 2106684 A1 | 10/2009 |
| EP | 3491613 A1 | 6/2019 |
| JP | 6963102 B2 | 11/2021 |
| WO | 2009141465 A1 | 11/2009 |
| WO | 2018057799 A1 | 3/2018 |
| WO | 2018203337 A1 | 11/2018 |
| WO | 2019144231 A1 | 8/2019 |

OTHER PUBLICATIONS

Supplementary European Search Report dated Aug. 14, 2023 in connection with European Patent Application No. 20851590.8, 12 pages.

Notice of Second Office Action dated Sep. 2, 2023 in connection with Chinese Patent Application No. 202080057316.8, 22 pages.

Jansen et al., "Induced plant volatiles allow sensitive monitoring of plant health status in greenhouses," Plant Signaling & Behavior, 2009, pp. 824-829.

Koppert Biological Systems, "Airbug," Product Specification, Apr. 2020, 3 pages.

Koppert Biological Systems, "Biological pest management to ensure healthy crops," Product List, Dec. 2016, 1 page.

Mandow et al., "The Autonomous Mobile Robot AURORA for Greenhouse Operation," IEEE Robotics and Automation Magazine, Dec. 1996, 11 pages.

Nicolai et al., "Nondestructive measurement of fruit and vegetable quality by means of NIR spectroscopy: A review," Science Direct, Postharvest Biology and Technology, 2007, pp. 99-118.

Ruiz-Altisent et al., "Sensors for product characterization and quality of specialty crops—A review," Computers and Electronics in Agriculture, 2010, pp. 176-194.

Sankaran et al., "A review of advanced techniques for detecting plant diseases," Computer and Electronics in Agriculture, vol. 72, Jun. 2010, 13 pages.

Story et al., "Automated Machine Vision Guided Plant Monitoring System for Greenhouse Crop Diagnostics," Acta Hortic, 2014, pp. 636-641 (abstract only).

Ton et al., "Phytomonitoring: A Bridge from Sensors to Information Technology for Greenhouse Control," Phytech Ltd., 2003, pp. 639-644.

Office Action dated Jul. 1, 2020 in connection with U.S. Appl. No. 16/268,744, 20 pages.

(56) References Cited

OTHER PUBLICATIONS

Office Action dated Mar. 11, 2020 in connection with U.S. Appl. No. 15/219,328, 21 pages.
Office Action dated Sep. 18, 2020 in connection with U.S. Appl. No. 15/219,328, 24 pages.
International Search Report and Written Opinion of the International Searching Authority in connection with International Patent Application No. PCT/CA2020/051099 dated Nov. 6, 2020, 11 pages.
Fuxman et al., "Real-Time Projections and Estimated Distributions of Agricultural Pests, Diseases, and Biocontrol Agents," U.S. Appl. No. 16/883,354, filed May 26, 2020, 52 pages.

\* cited by examiner

MOBILE PLATFORM FOR CROP MONITORING AND TREATMENT

CROSS-REFERENCE TO RELATED APPLICATION AND PRIORITY CLAIM

This application claims priority under 35 U.S.C. § 119(e) to U.S. Provisional Patent Application No. 62/885,448 filed on Aug. 12, 2019, which is hereby incorporated by reference in its entirety.

TECHNICAL FIELD

This disclosure relates to mobile platforms for crop monitoring and treatment and methods for operating the same. Some embodiments of this disclosure relate to mobile platforms for simultaneous, targeted administration of both biological and chemical agents.

BACKGROUND

When food and other crops are grown on a large scale, either in protected cultivation (such as in a greenhouse) or outdoors, growers face several challenges. For example, it can be difficult for a grower to know if, where, and when a crop has a problem (such as a problem related to a pest, disease, water, other abiotic stress, or nutritional deficiency) and the extent of the problem until it is readily visible to human scouts, who are often employed to visually inspect the crop. By that stage, the problem may often require expensive and extensive intervention. In some cases, rather than having human scouts identify individual plants or areas of a crop that have problems and then treating them, some crop management practices and treatments are employed prophylactically across the entire crop, even though crops are rarely uniform and problems tend to be localized.

More recently, various sensor-based systems have been developed for crop monitoring. For example, some systems use a static grid of sensors suspended above a crop or positioned among plants in the crop. Such sensory grids can be used to monitor environmental conditions or general responses from plants on a coarse-grained scale. Some sensory devices clip to plants or otherwise contact the plants. Some systems rely on visual detection of causal factors (such as pests or diseases) using motion detection or visual pattern recognition. Some sensory devices and systems are geared toward specific indicators. Some sensory systems can collect very general information (such as temperature and humidity) but cannot accurately pinpoint problems at the level of individual plants nor convey information in real-time to precipitate immediate action or responses. Mobile systems for crop health monitoring, assessment, and diagnosis that include mobile sensory platforms or vehicles equipped with arrays of sensors are also known, and there is an increasing trend toward automation of such systems.

Pesticides are widely used in crop cultivation and can be extremely effective. However, there is increasing concern about the effects of pesticides on the environment and on other organisms, including on human and animal health. Another problem with using pesticides to control pests is that, in some cases, the pests may develop resistance to the pesticide over time.

The use of biological control agents for pest and disease control involves the use of another living organism or natural product, rather than a chemical, to reduce or eliminate a pest or a disease. Classical biological control generally involves the introduction of natural predators, parasites, or pathogens of a pest into an area to protect or treat a crop. Some advantages of biological control agents are that they do not cause environmental contamination, and pests do not become resistant to the biological control agents. However, in most cases, live biological control agents cannot be used simultaneously with chemical pesticides to treat the same plant or crop, as the pesticides can be fatal to the live biological control agents or at least have an adverse effect on them. Some chemical pesticides can also have residual effects on the biological control agents, and for that reason there is generally a waiting period before biological control agents can be introduced after a pesticide application.

Because of costs and other factors, it is generally desirable to reduce the amounts of pesticides and biological control agents that are used by applying them only where and when they are needed, rather than treating an entire crop or treating a crop as a matter of course even in absence of a problem. Early and rapid identification of problems in a crop followed by immediate and precise intervention focused on where it is needed can allow growers to make efficient use of chemical pesticides and biological control agents and to achieve higher yields of their crops.

SUMMARY

This disclosure relates to mobile platforms for crop monitoring and treatment and methods for operating the same.

In a first embodiment, a mobile crop monitoring and treatment system includes a vehicle with a propulsion system and multiple sensors mounted on the vehicle. Each sensor is configured to capture data pertaining to at least one plant-related parameter when the sensor is positioned proximate to a plant in a crop. The mobile crop monitoring and treatment system also includes a storage system configured to house multiple treatment agents that include at least one chemical pesticide and at least one biological control agent on-board the vehicle. The mobile crop monitoring and treatment system further includes an application system configured to apply one or more of the treatment agents to the plant. In addition, the mobile crop monitoring and treatment system includes a controller configured to control movement of the vehicle and operation of the sensors and the application system. The controller is configured to cause the application system to apply one or more of the treatment agents to the plant in response to one or more signals from one or more of the sensors.

In some embodiments, the mobile crop monitoring and treatment system further includes an on-board computer processor, and the controller is configured to cause the application system to apply the one or more treatment agents to the plant at a dosage and a concentration determined by the on-board computer processor in response to the one or more signals from the one or more sensors.

In some embodiments, the application system includes at least one robotic arm and at least one applicator.

In some embodiments, the storage system includes at least one chemical pesticide container configured to house the at least one chemical pesticide, at least one biological control agent container configured to house the at least one biological control agent, and at least one carrier container configured to house at least one solvent or carrier.

In some embodiments, the controller is configured to cause the mobile crop monitoring and treatment system to draw the at least one chemical pesticide from the at least one chemical pesticide container, draw the at least one solvent or carrier from the at least one carrier container, and combine the at least one chemical pesticide and the at least one solvent or carrier upstream of the at least one applicator.

In some embodiments, the at least one chemical pesticide container includes a multi-compartment container and a pump, each compartment of the multi-compartment container is configured to house a different pesticide or pesticide component material, and the controller is configured to cause the pump to selectively draw multiple pesticides or pesticide component materials from the multi-compartment container and mix the multiple pesticides or pesticide component materials in a mixing region.

In some embodiments, the mixing region is upstream of the at least one applicator.

In some embodiments, the mixing region is downstream of the at least one applicator.

In some embodiments, the at least one biological control agent container includes an aerator or agitator.

In some embodiments, the mobile crop monitoring and treatment system further includes at least one ultraviolet light positioned on the at least one robotic arm.

In some embodiments, the mobile crop monitoring and treatment system is a ground-based system.

In some embodiments, the mobile crop monitoring and treatment system is an air-borne system.

In some embodiments, the mobile crop monitoring and treatment system forms part of a robotic scout.

In some embodiments, the mobile crop monitoring and treatment system forms part of a cart that is configured to be driven by an operator.

In a second embodiment, a method for treating a plant in a crop includes assessing a health of the plant in the crop by gathering sensor data using an automated vehicle equipped with multiple sensors. The method also includes processing the sensor data to determine a treatment to be applied to the plant in the crop. The method further includes dispensing the treatment from a storage system carried on-board the automated vehicle, where the storage system houses at least one chemical pesticide and at least one biological control agent. In addition, the method includes delivering the treatment to the plant in the crop via a robotic arm and an applicator carried on-board the automated vehicle. A concentration and a dosage of the treatment applied to the plant in the crop are controllable and adjustable by a controller on-board the automated vehicle.

In some embodiments, the sensor data is processed on-board the automated vehicle to determine the treatment to be applied to the plant in the crop.

In some embodiments, dispensing the treatment from the storage system includes mixing multiple chemical pesticides or pesticide component materials drawn from the storage system with at least one carrier to provide a desired formulation.

In some embodiments, dispensing the treatment from the storage system includes mixing multiple chemical pesticides or pesticide component materials drawn from the storage system with at least one carrier and with at least one adjuvant to provide a desired formulation.

In some embodiments, the at least one biological control agent is housed in a container in the storage system, and the method further includes agitating or aerating the at least one biological control agent so that the at least one biological control agent is more uniformly dispersed within the container.

In a third embodiment, a mobile crop monitoring and treatment system includes a vehicle with a propulsion system and multiple sensors mounted on the vehicle. Each sensor is configured to capture data pertaining to at least one plant-related parameter when the sensor is positioned proximate to a plant in a crop. The mobile crop monitoring and treatment system also includes a storage system configured to house chemical pesticides and biological control agents on-board the vehicle. The storage system includes multiple containers, and at least one of the containers includes multiple compartments. The compartments of the containers are collectively configured to store multiple materials including the chemical pesticides or pesticide component materials, the biological control agents, one or more solvents, and one or more adjuvants. The mobile crop monitoring and treatment system further includes one or more applicators configured to apply one or more treatments to the plant and one or more robotic arms configured to position at least one of the one or more applicators for application of the one or more treatments to the plant. In addition, the mobile crop monitoring and treatment system includes a controller configured to control movement of the vehicle and operation of the mobile crop monitoring and treatment system. The controller is configured to cause the one or more applicators to apply the one or more treatments to the plant in response to one or more signals from one or more of the sensors. Different treatments are associated with different materials or combinations of materials from the containers.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4A through 6B illustrate example storage containers/dispensers that can be used on-board a mobile crop monitoring and treatment system and from which at least one treatment can be dispensed in accordance with this disclosure.

DETAILED DESCRIPTION

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
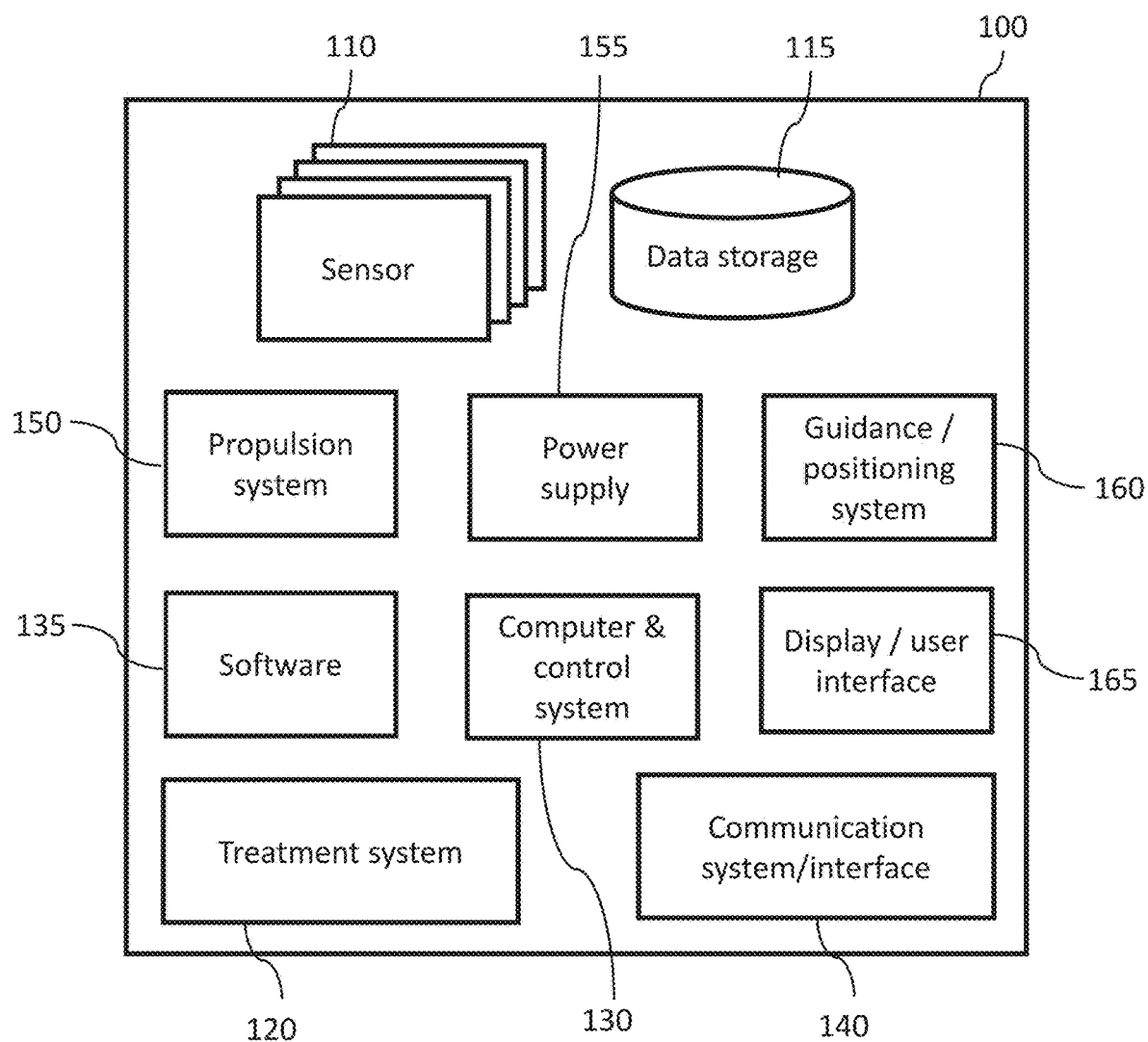
FIG. 1 illustrates an example mobile crop monitoring and treatment system in accordance with this disclosure.

FIG. 1 illustrates an example mobile crop monitoring and treatment system 100 in accordance with this disclosure. As shown in FIG. 1, the mobile system 100 includes multiple sensors 110 and at least one data storage device 115 configured to store data captured by the sensors 110. Various types of sensors 110 may be used in the mobile system 100, examples of which are described below. Each sensor 110 includes any suitable structure configured to capture data pertaining to at least one plant-related parameter, such as when the sensor 110 is positioned proximate to each of one or more plants in one or more crops. Various types of data storage devices 115 may also be used in the mobile system 100, such as one or more volatile or non-volatile memories. Example types of data storage devices 115 that may be used in the mobile system 100 include a random access memory, a read only memory, a hard drive, a Flash memory, or an optical disc.

The mobile system 100 also includes a treatment system 120, which is configured to apply one or more treatment agents (such as at least one chemical pesticide and/or at least one biological control agent) to each of one or more plants in one or more crops. The treatment system 120 includes any suitable structure configured to deliver one or more treatment agents to plants. Details of an example implementation of the treatment system 120 are provided below.

The mobile system 100 further includes a computer and control system 130 with associated software 135. The computer and control system 130 is configured to control the overall operation of the mobile system 100, such as by controlling movement of the mobile system 100 and operation of the sensors 110 and treatment system 120. The computer and control system 130 can execute the software 135 in order to perform its functions. The computer and control system 130 includes at least one processor, such as at least one of a central processing unit (CPU), a graphics processing unit (GPU), a data processing unit (DPU), and a Tensor processing unit (TPU). An on-board DPU or other processor(s) of the computer and control system 130 can be used, for example, to process sensor data and determine one or more suitable treatments to be applied to one or more plants in one or more crops. Note that while the software 135 here is shown as a separate component, the software 135 may be stored internally within the computer and control system 130, such as in a non-volatile memory of the computer and control system 130.

The mobile system 100 may optionally include a communication system/interface 140, which may allow the mobile system 100 to communicate information and data to one or more external systems or devices and/or to receive information or commands from one or more external systems or devices. In some embodiments, the communication system/interface 140 may include an external serial connection that is provided to allow a user to connect a personal computer (PC) or other device to the mobile system 100, such as in order to modify the software 135 on-board the mobile system 100. Also, in some embodiments, the communication system/interface 140 may include at least one wireless radio or other wireless transmitter, receiver, or transceiver that allows wireless communications to and/or from the mobile system 100.

The mobile system 100 also includes a propulsion system 150, which is configured to move the mobile system 100 (such as on the ground or in the air). The propulsion system 150 includes any suitable structure configured to propel or otherwise move the mobile system 100, such as an electric motor, wheels, propellers, etc. The mobile system 100 further includes a power supply 155, which is configured to provide operating power to other components of the mobile system 100. The power supply 155 includes any suitable structure configured to provide operating power to the mobile system 100. In some embodiments, the power supply 155 includes at least one battery or other energy storage device and associated recharging equipment. In particular embodiments, the power supply 155 includes a power management system that is configured to provide for switching between multiple energy sources. The power management system may also incorporate safety and protection devices.

The mobile system 100 may further include a guidance and positioning system 160, which can be configured to identify a location of the mobile system 100 and to support navigation by the mobile system 100. In some embodiments, the guidance and positioning system 160 produces location tags that can be associated with sensor measurements, where the location tags identify positions at which the sensor measurements are captured. The location tags can be stored in the data storage device 115 and optionally transmitted, along with the sensor data, via the communication system/interface 140. The guidance and positioning system 160 includes any suitable structure configured to identify a location of the mobile system 100, such as a Global Positioning System (GPS) receiver or other satellite-based receiver, an Ultra-Wideband (UWB) receiver, a Radio Frequency Identification (RFID) device, or other device. Note that the guidance and positioning system 160 may operate by receiving incoming signals to identify its location or by transmitting outgoing signals that allow other components to identify its location.

In addition, the mobile system 100 may include a display and/or user interface 165, which can be used to provide information to a user or receive information from the user. For example, the display and/or user interface 165 may be used to identify current settings of the mobile system 100, sensor measurements captured by the sensors 110, or treatments to be applied by the treatment system 120. The display and/or user interface 165 may also be used to receive user observations of plant conditions, user confirmations of proposed treatments, or other information. The display and/or user interface 165 includes any suitable structure configured to provide information to or receive information from a user, such as a liquid crystal display (LCD), light-emitting diode (LED) display, or other display device. Depending on the implementation, the display and/or user interface 165 may include physical buttons and/or a touchscreen.

In some embodiments of the mobile crop monitoring and treatment system 100, the position(s) of one, some, or all of the sensors 110 can be adjustable so that the sensor(s) 110 can be positioned appropriately. Various factors can affect how one or more of the sensors 110 are positioned, such as the size (like height and/or volume) of a plant being inspected and which region of the plant is to be sensed. In particular embodiments, at least some of the sensors 110 can be moved and re-positioned automatically (rather than manually) based on commands from a control system, which can be responsive to inputs indicative of where the sensor(s) 110 should be positioned.

Note that the mobile crop monitoring and treatment system 100 here can be implemented in a number of ways depending on particular needs. For example, in some embodiments, the mobile system 100 is implemented as a ground-based platform, such as when the mobile system 100 is implemented using a robotic ground-based scout or other ground-based device. In other embodiments, the mobile system 100 is implemented as an air-borne platform, such as when the mobile system 100 is implemented using a robotic air-borne scout or other air-based device (like a drone). Combinations of approaches may also be used, such as when the mobile crop monitoring and treatment system 100 includes a robotic ground-based scout or other ground-based device that operates in conjunction with a robotic air-borne scout or other air-based device. As particular examples, ECOATION INNOVATIVE SOLUTIONS INC. offers various products that can be used in greenhouses or other locations, such as the OKO manually-driven cart (which includes an interactive display that can be used by an operator) and the IRIS SCOUTROBOT robotic scout. The mobile system 100 may be incorporated into either of these products and used manually or autonomously. For instance, in the case of the OKO cart, an operator may drive the cart to specific locations and use an interactive display to distribute one or more chemical pesticides or biological control agents. In the case of the IRIS robotic scout, one or more chemical pesticides or biological control agents may be distributed in an autonomous manner. In general, this disclosure is not limited to any particular manual, partially automated, or fully automated manner of distributing chemical pesticides or biological control agents.

Although FIG. 1 illustrates one example of a mobile crop monitoring and treatment system 100, various changes may be made to FIG. 1. For example, various components shown in FIG. 1 may be combined, further subdivided, replicated, rearranged, or omitted and additional components may be added according to particular needs.

Figure 2:
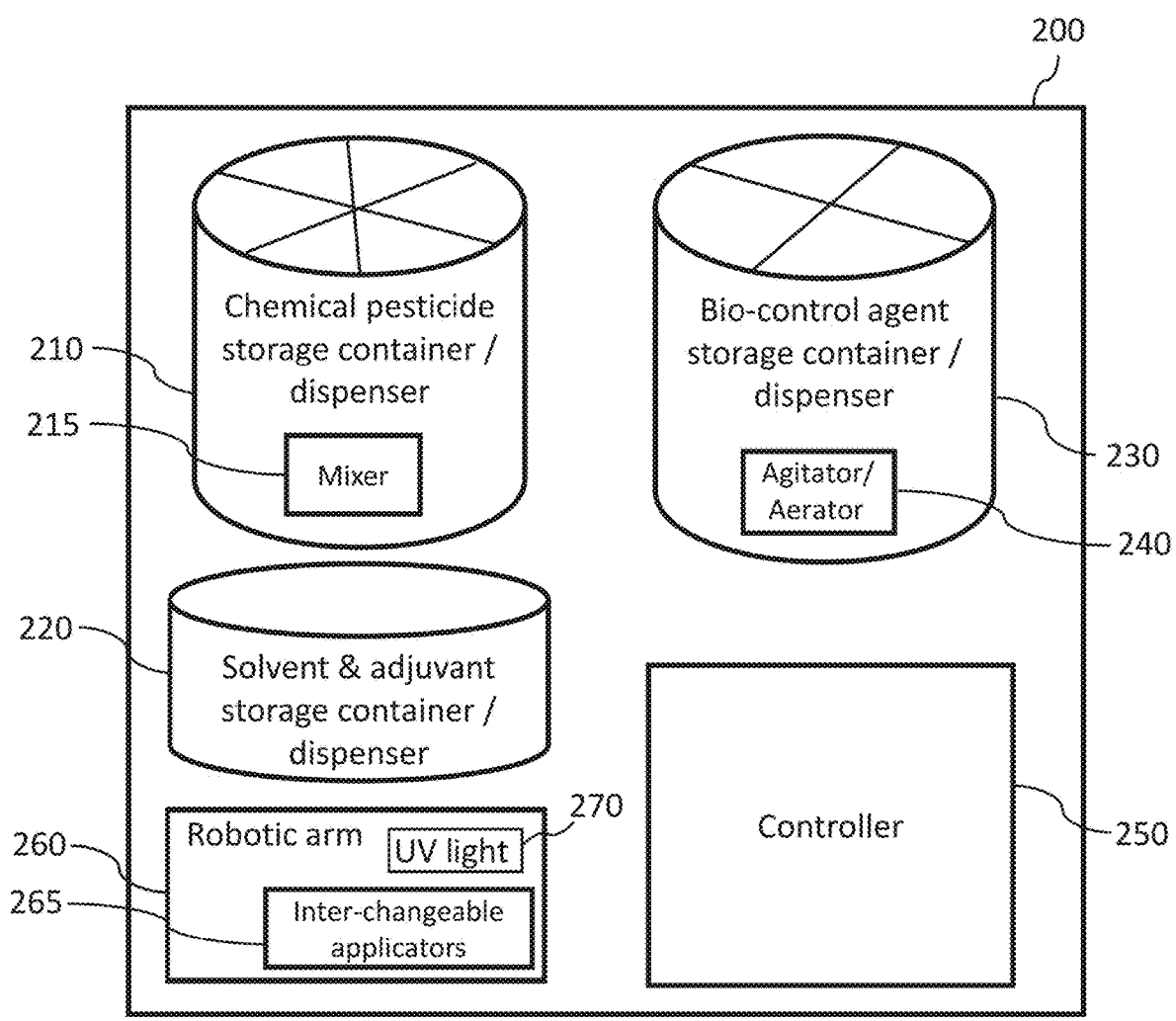
FIG. 2 illustrates an example crop treatment system that can be incorporated into a mobile crop monitoring and treatment system in accordance with this disclosure.

FIG. 2 illustrates an example crop treatment system 200 that can be incorporated into a mobile crop monitoring and treatment system in accordance with this disclosure. For example, the crop treatment system 200 may be used to at least partially implement the treatment system 120 of the mobile crop monitoring and treatment system 100 in FIG. 1. Note, however, that the crop treatment system 200 may be used in any other suitable mobile system.

As shown in FIG. 2, the crop treatment system 200 includes at least one chemical pesticide storage container/dispenser 210, which is configured to receive, hold, and dispense at least one chemical pesticide. For example, each chemical pesticide storage container/dispenser 210 can include one or more containers that receive and hold one or more pesticides or pesticide component materials. Each chemical pesticide storage container/dispenser 210 can also include one or more devices used to draw the chemical pesticide(s) or component material(s) from the container(s) for use. In this example, the chemical pesticide storage container/dispenser 210 includes a mixer 215, which may be configured to mix pesticide formulations as needed or desired. For instance, the mixer 215 may be configured to receive different combinations of stored chemical pesticides or component materials and to mix the combinations of stored chemical pesticides or component materials. Each chemical pesticide storage container/dispenser 210 includes any suitable structure configured to retain and dispense at least one pesticide or component material. Each mixer 215 includes any suitable structure configured to mix materials.

The crop treatment system 200 also includes at least one solvent and adjuvant storage container/dispenser 220, which is configured to receive, hold, and provide one or more solvents and/or one or more adjuvants. A solvent refers to a liquid or other material into which at least one chemical pesticide can be dissolved or mixed, and an adjuvant refers to a liquid or other material that helps to enhance the effectiveness of one or more pesticides. The solvent(s) and/or adjuvant(s) can be drawn from the solvent and adjuvant storage container/dispenser 220 and combined with one or more pesticides from the chemical pesticide storage container/dispenser 210. Each solvent and adjuvant storage container/dispenser 220 includes any suitable structure configured to retain and dispense at least one solvent and/or at least one adjuvant.

The crop treatment system 200 further includes at least one biological control agent storage container/dispenser 230, which is configured to receive, hold, and dispense at least one biological control agent. A biological control agent refers to one or more living organisms or natural products that can be used to reduce or eliminate a pest, disease, or other problem with a plant. For example, each biological control agent storage container/dispenser 230 can include one or more containers that receive and hold one or more biological control agents. Each biological control agent storage container/dispenser 230 can also include one or more devices used to distribute the biological control agent(s) from the container(s) for use. In this example, the biological control agent storage container/dispenser 230 includes an agitator and/or aerator 240. An agitator can be used to distribute one or more biological control agents more evenly within the container/dispenser 230. An aerator can be used to provide air to one or more biological control agents within the container/dispenser 230. While not shown here, the biological control agent storage container/dispenser 230 can include a mixer, which may be configured to mix different combinations of biological control agents as needed or desired. For instance, the mixer may be configured to receive different combinations of stored biological control agents and to mix the combinations of stored biological control agents. Each biological control agent storage container/dispenser 230 includes any suitable structure configured to retain and dispense at least one biological control agent.

Note that one, some, or all of the containers/dispensers 210, 220, and 230 can be divided into multiple compartments for use in storing different materials or agents. Also, one, some, or all of the containers/dispensers 210, 220, and 230 may include one or more pumps (not shown), where each pump is configured to dispense one or more materials from one or more containers. Different example implementations of the containers/dispensers 210, 220, 230 are discussed below, although these implementations are for illustration only.

The crop treatment system 200 also includes a controller 250, which can be used to determine the treatment or treatments to be administered to each of various plants in at least one crop and to control the dispensing, formulation, dilution, dosage, and application of such treatments. The controller 250 includes at least one processor or other processing device configured to perform control operations. In some embodiments, the controller 250 may form part of a computer and control system used for a broader system of which the crop treatment system 200 is a part, such as when the controller 250 forms a part of the computer and control system 130 in the system 100 of FIG. 1. In other embodiments, the controller 250 may represent a separate computer-based controller or other stand-alone controller. If the controller 250 is used in conjunction with another device (such as an on-board computer processor in the computer and control system 130), the described functionality of the controller 250 may be distributed. As a particular example, the on-board computer processor may determine a dosage and a concentration for a treatment to be applied to a plant in response to one or more signals from one or more sensors 110, and the controller 250 may initiate the treatment to the plant based on the identified dosage and concentration.

In addition, the crop treatment system 200 includes at least one robotic arm 260 and interchangeable applicators 265, which are configured to apply one or more treatments to various plants in at least one crop under the control of the controller 250. For example, the at least one robotic arm 260 can be used to selectively position one or more applicators 265 at one or more desired positions at or near each plant being treated, and the one or more applicators 265 can be used to dispense one or more treatments for the plants. Each robotic arm 260 includes any suitable structure configured to be moved in order to selectively position one or more applicators 265. Each applicator 265 includes any suitable structure configured to apply one or more treatments. For instance, the applicators 265 can include different nozzles, hoses, sprayers, rollers, misters, foggers, dusters, atomizers, and/or any other suitable applicators. While not shown here, the applicators 265 and/or robotic arm 260 may include one or more valves or other flow control devices configured to start, stop, and adjust the flow of material(s), such as one or more chemical pesticides and/or one or more biological control agents. Also while not shown here, the applicators 265 and/or robotic arm 260 may include one or more grippers or other structures designed to grasp or otherwise physically manipulate plants during inspection or treatment. The type(s) of applicator(s) 265 and/or grippers used can vary based on various factors, such as the type(s) of plant(s) to be treated and inspected. In addition, the robotic arm 260 may be used to carry other components that are not used to dispense chemical pesticides and biological control agents but that may be used to treat plant problems in other ways. For instance, the robotic arm 260 may carry at least one ultraviolet (UV) light 270, such as one that produces UV-c light, since ultraviolet light can be used to treat plant diseases like powdery mildew.

Note that the crop treatment system 200 or a similar system can be incorporated into a mobile sensory platform for crop health monitoring. Example platforms in which the crop treatment system 200 may be used can include the one described above with respect to FIG. 1, as well as the ones described in U.S. Pat. No. 10,241,097 and U.S. Patent Application Publication No. 2017/0032258 (both of which are hereby incorporated by reference in their entirety). Other example platforms in which the crop treatment system 200 may be used can include the OKO cart and IRIS SCOUT-ROBOT robotic scout from ECOATION INNOVATIVE SOLUTIONS INC.

Although FIG. 2 illustrates one example of a crop treatment system 200 that can be incorporated into a mobile crop monitoring and treatment system, various changes may be made to FIG. 2. For example, various components shown in FIG. 2 may be combined, further subdivided, replicated, rearranged, or omitted and additional components may be added according to particular needs. Also, certain chemical pesticides and biological control agents may be delivered in other ways and need not be stored in containers and sprayed through applicators. For instance, a chemical pesticide or biological control agent may be placed on a tray, and a gripper or other portion of a robotic arm 260 may be used to grasp and deliver the chemical pesticide or biological control agent.

Figure 3A:
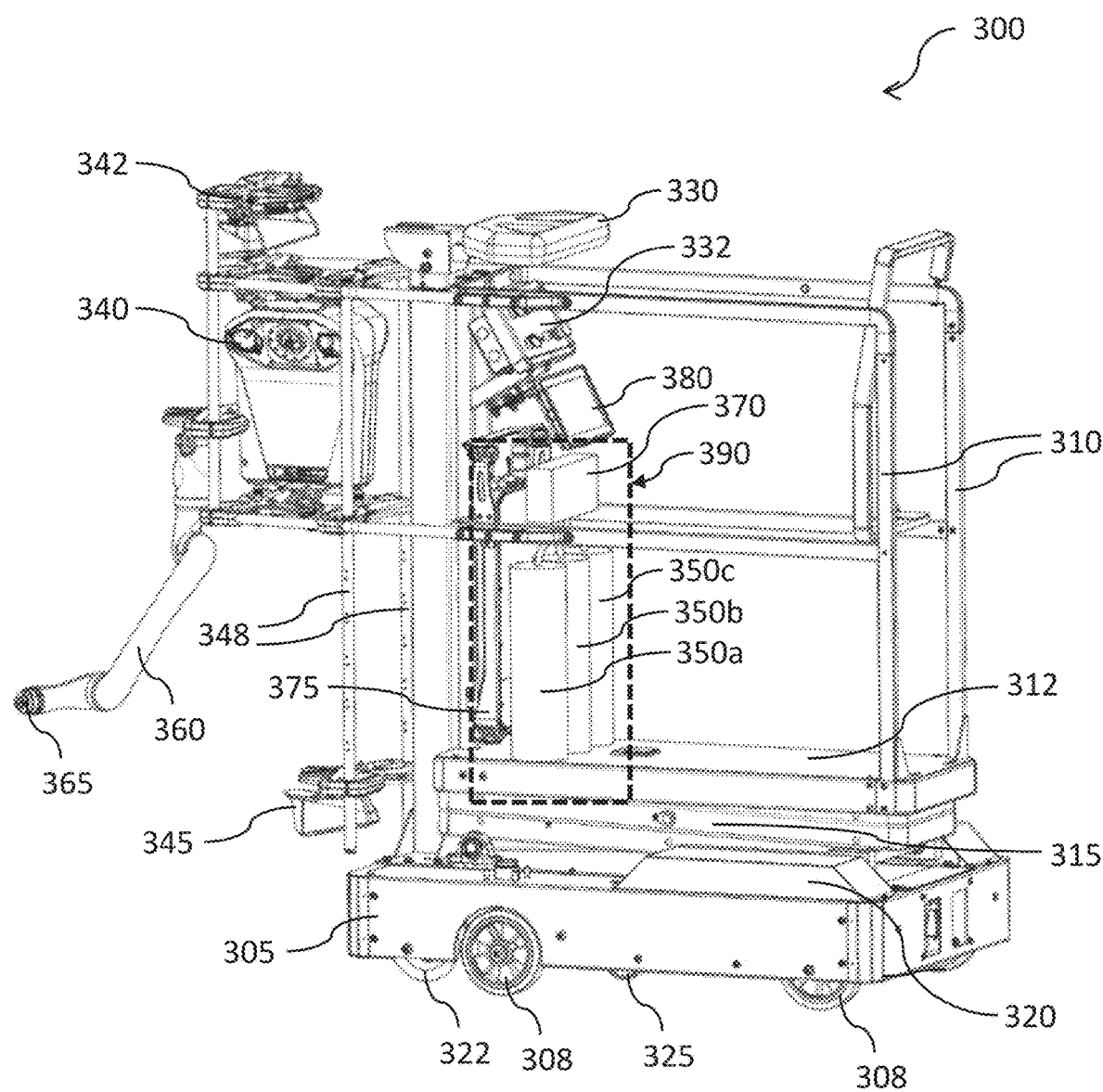
FIGS. 3A and 3B illustrate a specific example implementation of a mobile crop monitoring and treatment system in accordance with this disclosure.
Figure 3B:
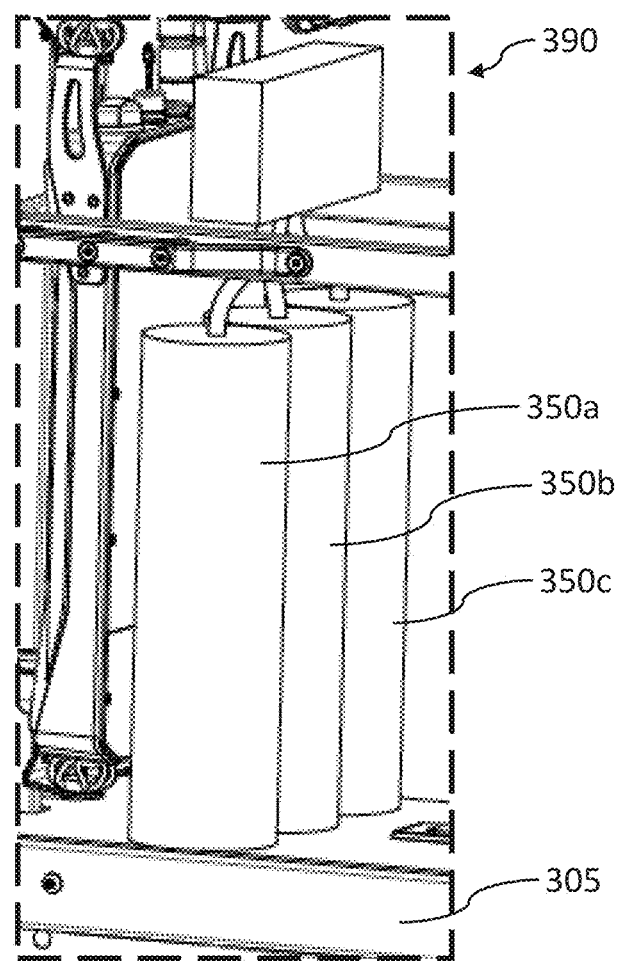

FIGS. 3A and 3B illustrate a specific example implementation of a mobile crop monitoring and treatment system 300 in accordance with this disclosure. The mobile crop monitoring and treatment system 300 here can include various components shown in FIGS. 1 and 2 that are described above. As shown in FIG. 3A, the mobile system 300 includes a cart 305 having four wheels 308 (two of which are visible) and a frame 310 mounted to a platform 312. The platform 312 is, in turn, mounted to a scissor lift 315. The scissor lift 315 allows the platform 312, the frame 310, and components mounted to the platform 312 or the frame 310 to be raised and lowered. This may be done, for instance, depending on the heights of plants in a crop being inspected or treated.

A power supply, which in this example includes a battery 320, is carried on-board the cart 305. The power supply can provide electrical power to various on-board systems and electrical power used for propulsion of the mobile system 300. In some embodiments, the mobile system 300 can represent an adaption of a typical pipe rail trolley that is often used in horticulture and greenhouse applications and that is designed to maneuver through small pathways and to be adjustable to desired heights. A pipe rail mounting wheel 322 and a pipe rail detection sensor 325 can be used to guide the mobile system 100 through crops in situations where there are pipe rails.

In some instances, the mobile system 300 may be configured to operate in an autonomous manner (without an on-board operator or driver). In other instances, a human (such as a farmer or grower) can optionally ride aboard the mobile system 300 on the platform 312, such as while acting as an observer or to drive or otherwise operate one or more aspects of the mobile system 300 manually. A steering device 330 can be used to steer the mobile system 300 manually, and a mobility controller 332 can be used to manually control propulsion of the mobile system 300, such as when the mobile system 300 is not under automated control.

The mobile system 300 also includes an on-board crop monitoring system that includes various sensors and sensor modules mounted to the frame 310. In some embodiments, the position(s) of one, some, or all of the sensors/sensor modules can be adjustable during operation of the mobile system 300, and a control system can control the position(s) of the sensor(s)/sensor module(s). In this example of the mobile system 300, the mobile system 300 includes a crop health monitoring sensor module 340 and imaging sensors 342 and 345. In some embodiments, the crop health monitoring sensor module 340 represents a multi-sensor module that can include various types of sensors contained in a housing. The imaging sensors 342 and 345 can be used to capture images of different portions of plants. For example, the imaging sensor 342 can be used to image a crop head, and the imaging sensor 345 (the height of which can be adjusted by moving it up and down on mounting rods 348 automatically or manually) can be used for fruit imaging.

The mobile system 300 may include any other or additional sensors. Other sensors on-board the mobile system 300 can include, for example, physiological sensors, surface analysis sensors, chemical sensors, microclimate sensors, and/or canopy screening sensors. In some embodiments, the mobile system 300 includes at least one physiological sensor that includes at least one configurable optical probe and at least one tunable detector, at least one surface analysis sensor that includes at least one full spectrum light source and at least one spectroscopic detector, and at least one chemical analysis sensor (which may include at least one photo-ionization detector, at least one surface acoustic wave sensor, and/or at least one quartz crystal microbalance sensor). In particular embodiments, the mobile system 300 includes a multispectral or hyperspectral imaging device, a leaf temperature sensor, an evapotranspiration sensor, a surface electrical charge sensor, a terahertz sensor, a spore detection sensor, and/or a tunable microphone.

The mobile system 300 further includes an on-board crop treatment system that includes multiple material storage containers and associated dispensers from which chemical pesticides or pesticide component materials (possibly with appropriate solvents and/or adjuvants) and biological control agents are drawn and administered to plants in a crop. In this example embodiment, the mobile system 300 includes three storage containers/dispensers 350a, 350b, and 350c, each of which can have one or more compartments and can include one or more mixers, aerators, agitators, and/or smart pumps. Example implementations of storage containers and dispensers are described in more detail in reference to FIGS. 4A through 6B below. However, other containers and dispensers and other numbers of containers and dispensers may be used.

The material storage containers/dispensers 350a, 350b, and 350c can be selectively fluidly connected to deliver chemical pesticides, suitable solvents and/or adjuvants, and biological control agents to at least one robotic arm 360 via which they are selectively applied to plants in a crop in a targeted, localized manner. Each robotic arm 360 can have multiple degrees of freedom, such as when the robotic arm 360 can swivel, pivot, extend, etc., so that treatment can be selectively applied to a desired location on each individual plant. The robotic arm 360 may include an interchangeable applicator (such as a spray nozzle or other applicator 265) or gripper 365 that can be changed automatically or on demand and may be adjustable. Alternative applicators or grippers (not shown) can be carried on-board the mobile system 300 and connected to the robotic arm 360 as needed. Some applicators 365 can have UV lights at the end, and the robotic arm 360 can point the UV light attachment to specific areas of the plants or crop to treat diseases.

In some embodiments, the mobile crop monitoring and treatment system 300 (or the mobile system 100 described above) can be controlled and operated from a remote location (such as via wireless communications) and/or can be equipped with one or more on-board computers and controllers for controlling propulsion of the mobile system and operation of the sensor-based on-board crop monitoring system and on-board crop treatment system. In this example, the mobile system 300 includes two on-board computer-based control systems 370 and 375, and the mobile system 300 can be operated and controlled autonomously using these on-board computer-based control systems 370 and 375. For example, these systems 370 and 375 can be used to analyze the results from the on-board crop monitoring system, such as based on the outputs of the various sensors, and determine in real-time what treatments will be applied to a crop using the on-board crop treatment system. The system 300 also includes an interactive display 380 that can provide information to a human who is on-board the mobile system 300. Any suitable information can be displayed, such as information about the findings of the on-board crop monitoring system and treatment being applied by the on-board crop treatment system.

FIG. 3B illustrates a portion 390 of the mobile crop monitoring and treatment system 300 of FIG. 3A and, in particular, shows the three material storage containers/dispensers 350a, 350b, and 350c in close-up view. These three material storage containers/dispensers 350a, 350b, and 350c can be the same as one another or different from one another. This can depend on a number of factors, such as the materials to be dispensed. In some embodiments, the material storage containers/dispensers 350a, 350b, and 350c can be formed of one or more materials that are inert and that will not contaminate or be degraded by the materials that are to be stored in them.

Although FIGS. 3A and 3B illustrate a specific example implementation of a mobile crop monitoring and treatment system 300, various changes may be made to FIGS. 3A and 3B. For example, various components shown in FIGS. 3A and 3B may be combined, further subdivided, replicated, rearranged, or omitted and additional components may be added according to particular needs. Also, the form of the cart and other physical components of the mobile system 300 can easily vary as needed or desired.

Figures 4A, 4B:
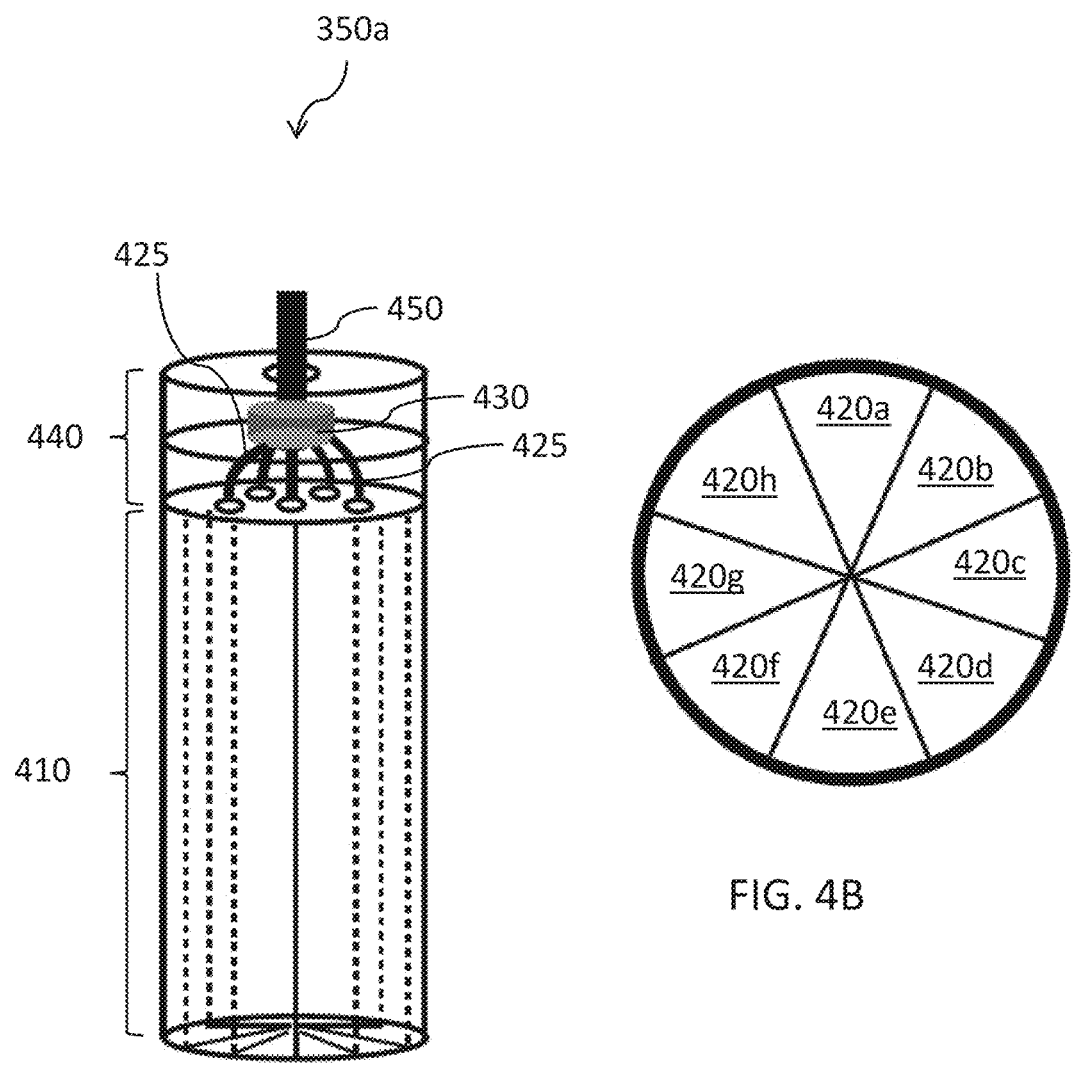
Figures 5A, 5B:
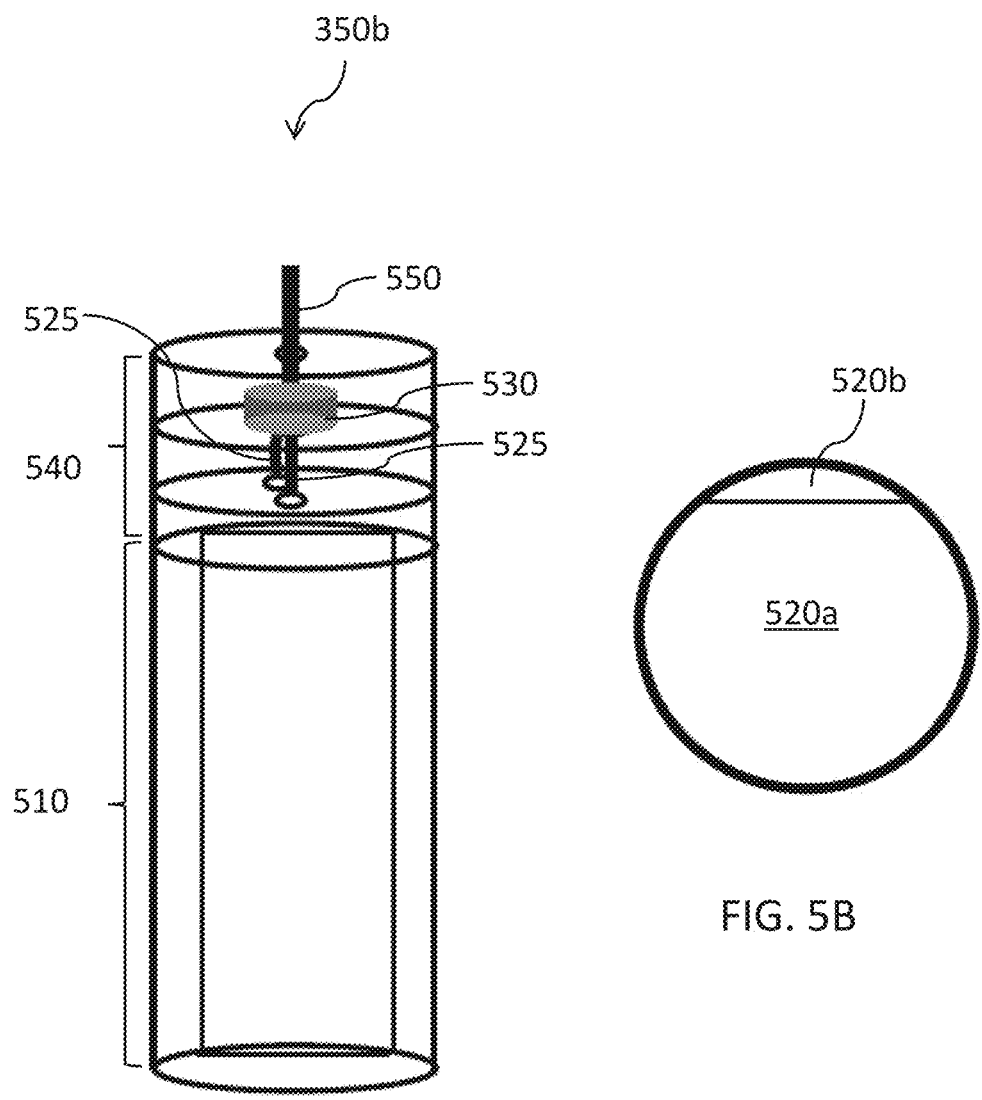
Figure 6A:
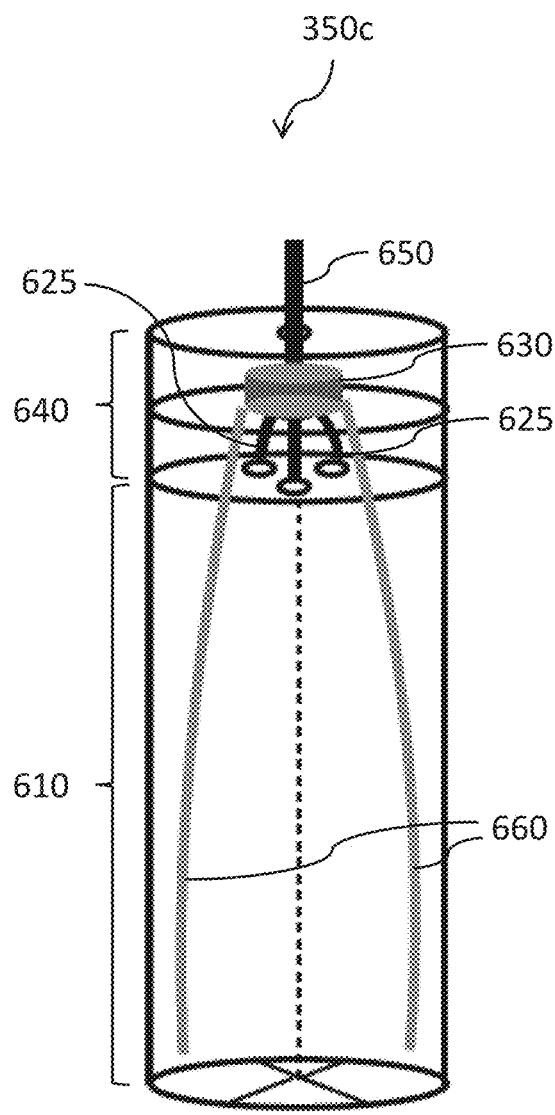
Figure 6B:
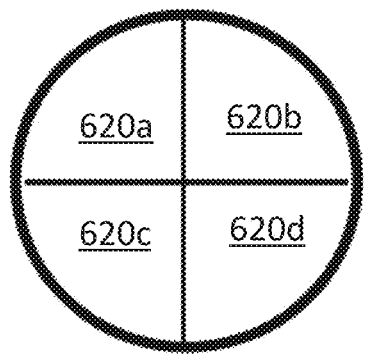

FIGS. 4A through 6B illustrate example storage containers/dispensers that can be used on-board a mobile crop monitoring and treatment system and from which at least one treatment can be dispensed in accordance with this disclosure. In particular, FIGS. 4A and 4B illustrate a first example storage container/dispenser 350a, FIGS. 5A and 5B illustrate a second example storage container/dispenser 350b, and FIGS. 6A and 6B illustrate a third example storage container/dispenser 350c. Note that these associations of different structures with different storage containers/dispensers 350a, 350b, and 350c are for illustration only and that each storage container/dispenser 350a, 350b, and 350c of the mobile system 300 may have any suitable structure.

As shown in FIG. 4A, the storage container/dispenser 350a includes a cylindrical storage area 410 that is divided vertically into eight compartments. As shown in FIG. 4B, a cross-sectional view of the storage area 410 shows the eight compartments 420a-420h, each of which can contain a different chemical pesticide or active ingredient thereof. Note that while the compartments 420a-420h here are shown as being generally equal in size, this need not be the case. Each compartment 420a-420h is connected to a smart pump 430 via a separate hose 425 or other connector. An on-board computer-based control system or other system can cause an appropriate pesticide or mix of pesticides or pesticide components to be drawn from one, some, or all of the compartments 420a-420h by the smart pump 430 and, if needed, to be mixed in a mixing area 440. The pesticide or mix of pesticides or pesticide components that is selected can be based on the specific problem that needs to be treated, which may be identified by the on-board sensor-based crop monitoring system. The pesticide or mix of pesticides or pesticide components is supplied from the mixing area 440 to an applicator, such as an applicator 265 on a robotic arm 260 or an applicator 365 on a robotic arm 360, via a supply line 450.

As shown in FIG. 5A, the storage container/dispenser 350b includes a cylindrical storage area 510 that is divided vertically into two compartments. As shown in FIG. 5B, a cross-sectional view of the storage area 510 shows the two compartments 520a-520b. Note that while the compartments 520-520b here are shown as being unequal in size, this need not be the case. The larger compartment 520a can contain at least one carrier (such as water or another suitable solvent or carrier) for one or more chemical pesticides in another container. The smaller compartment 520b can contain at least one adjuvant. Adjuvants can include, for example, wetter-spreaders, stickers or adherents, penetrants, compatibility agents, and/or ionic or non-ionic surfactants. In some embodiments, materials are given an electronic charge to enhance their adherence to the foliage of plants. Each compartment 520a and 520b is connected to a smart pump 530 via a separate hose 525 or other connector. An on-board computer-based control system or other system can cause an appropriate quantity of carrier and adjuvant to be drawn respectively from the compartments 520a and 520b by the smart pump 530, mixed in a mixing area 540, and supplied to an applicator, such as an applicator 265 on a robotic arm 260 or an applicator 365 on a robotic arm 360, via a supply line 550. In some cases, an appropriate dose of pesticide or a desired pesticide mixture can be drawn from the container/dispenser 350a and diluted to the desired concentration with the carrier/adjuvant mixture, and the desired dose can be delivered to at least one desired location on a plant or crop via the applicator. The pesticide(s) and carrier/adjuvant can be combined at the applicator, upstream of the applicator, or downstream of the applicator.

As shown in FIG. 6A, the storage container/dispenser 350c includes a cylindrical storage area 610 that is divided vertically into four compartments. As shown in FIG. 6B, a cross-sectional view of the storage area 610 shows the four compartments 620a-620d, each of which can contain a different biological control agent. Note that while the compartments 620a-620d here are shown as being generally equal in size, this need not be the case. The biological control agents may be in a liquid or solid formulation. In some cases, the biological control agents are stored and delivered along with a solid particulate carrier, such as a fibrous material, powder, or other particulate (like one derived from natural products such as leaves, husks, wood, or minerals). The carrier may help protect fragile living organisms and aid in dispersing the organisms during delivery to a plant. Each compartment 620a-620d is connected to a smart pump, blower, or fan 630 via a separate hose or tube 625 or other connector. An on-board computer-based control system or other system can cause one or more appropriate biological control agents to be drawn from the compartments 620a-620d by the smart pump, blower, or fan 630 and, if needed, mixed in a mixing area 640. The biological control agent or mix of agents that is selected can be based on the specific problem that needs to be treated, which may be identified by the on-board sensor-based crop monitoring system. The biological control agent or agents are supplied from the mixing area 640 to an applicator, such as an applicator 265 on a robotic arm 260 or an applicator 365 on a robotic arm 360, via a supply line 650. The dosage of the biological control agent(s) can be controlled by the computer-based control system depending on the nature and severity of the problem.

Some biological control agents will have a tendency to settle or congregate in specific regions of the compartments 620a-620d. Aeration hoses 660 can be used to blow air into the compartments 620a-620d from time to time or as needed to distribute the biological control agents (along with a carrier material if present) more evenly within the compartments 620*a*-620*d* prior to dispensing them. In some embodiments, air is supplied to the aeration hoses 660 by the smart pump, blower, or fan 630. Other suitable devices or techniques may also be used to distribute biological control agents more evenly within compartments prior to dispensing them, such as where propellers or other agitation devices may be used.

Although FIGS. 4A through 6B illustrate examples of storage containers/dispensers that can be used on-board a mobile crop monitoring and treatment system and from which at least one treatment can be dispensed, various changes may be made to FIGS. 4A through 6B. For example, the cylindrical shapes and the use of specific numbers of compartments are examples only and can vary as needed or desired. Each storage container/dispenser may have any suitable size and shape and may include any suitable number of compartments.

Returning to FIGS. 3A and 3B, in some embodiments, the robotic arm 360 and gripper 365 may pick up and apply other treatments that are stored on-board the mobile crop monitoring and treatment system 300. For example, the other treatments may be located on a tray or in a storage container. This may occur in response to commands from the computer-based control system.

Moreover, the embodiment of the mobile crop monitoring and treatment system 300 illustrated in FIG. 3A includes three multi-compartment material storage containers/dispensers and has a single robotic arm 360 and an interchangeable applicator or gripper 365. However, other embodiments of such systems can include different numbers and/or types and styles of storage containers/dispensers, applicators, and/or grippers. In some cases, at least one carrier and at least one adjuvant may be drawn from the same container as the active agent(s). Also, other embodiments of such systems may include more than one robotic arm and associated applicators or grippers, such as for applying treatments to different plants at the same time or for applying different treatments to the same plant at the same time. Each arm-applicator/gripper can be independently supplied with pesticides and/or biological control agents from an on-board storage system as described above. Other embodiments of such systems may include a robotic arm that has multiple applicators and/or grippers on it, or an individual applicator may have multiple outlets or nozzles.

In some embodiments, the pumps that are used to dispense materials from the on-board material storage system are multi-channel pumps suitable for precise, simultaneous metering or dosing of multiple materials (such as multiple chemical pesticides or components, carriers, and adjuvants) in desired and variable ratios. Also, in some embodiments, component materials of a particular treatment formulation can be mixed in a mixing region or container downstream of the pump(s) and upstream of the applicator(s) from which the treatment is delivered to a plant. In other embodiments, the desired quantities or ratios of the component materials are individually supplied to separate applicators (or to separate outlets or nozzles on a single applicator), and they mix as they exit the applicator outlets before they reach the plant. In other words, in these embodiments, the mixing region for at least some of the components of a particular treatment formulation can be downstream of the applicator outlets. This approach can offer some advantages. For example, if separate and dedicated supply lines are used to supply different materials or components of a treatment formulation to different applicator outlets, contamination of a treatment with materials from a previous treatments is reduced. In some cases, a chemical pesticide may have an adverse effect on other pesticides or biological control agents, and it is preferred that the latter materials do not come into contact with trace or residual amounts of the potentially-detrimental pesticide that could remain in a shared supply line. By having separate supply lines, this risk can be mitigated. Another approach if shared supply lines are used between the material storage system and the applicator(s) is to flush the shared supply lines with water or another solvent (pumped from the storage system) in between administering different treatments from the mobile system.

In some implementations, the mobile crop monitoring and treatment system 300 is deployed to autonomously scan a row of plants in order to identify one or more locations of pests or diseases as it moves in one direction along the row. The mobile system 300 can then rapidly or immediately determine appropriate treatment(s) to be administered via the on-board treatment system as the mobile system 300 moves back along the row of plants. The treatment and dosage that is applied can be specific for each plant or for a specific region of an individual plant and can be varied as the mobile system 300 moves among the plants. This can be repeated for any number of rows. The mobile system 300 can be configured so that the position of the plant, the cart, the robotic arm, and the applicator are known, allowing the appropriate treatment to be applied precisely where it is needed. This approach allows the treatment to be performed immediately after detection of a problem with the health of a plant, such as a pest or disease. Early detection and remediation of issues can greatly enhance crop yields.

Conventionally, entire crops are often treated with pesticide(s) and/or biological control agent(s) as a matter of course, even in the absence of an identified disease or pest. However, it is generally desirable to reduce the amount of chemical pesticides and biological control agents used for treating a crop, such as due to their costs and other potentially-adverse factors, especially those associated with the use of pesticides. Also, pesticides are conventionally applied to crops and then, only after a waiting period of several days, are biological control agents subsequently applied. In most cases, the delivery of biological control agents is done manually and prophylactically.

The systems and methods described in this disclosure allow for highly-tailored and targeted application of appropriate dosages of chemical pesticides and biological control agents at the precise locations where they are needed. This can substantially reduce the amount of these materials that are used. Furthermore, such localized or targeted application can allow biological control agents to be used simultaneously with chemical pesticides (or directly before or after treatment with chemical pesticides) to treat the same plant. For example, biological control agents can be applied to an area of a plant that is close to an area of infestation or disease that is being treated with a pesticide. In addition, the ability of the systems and methods described here to formulate on-demand and select appropriate dosages based on need, in response to information received from a sensor-based crop monitoring system, means that treatments can be applied effectively and efficiently in a timely manner.

In some embodiments, compartments in the storage containers are equipped with sensors to indicate the quantity of material(s) remaining in each compartment. The mobile system 300 can communicate information from these sensors to alert the user or operator if the material in a compartment needs to be replenished.

Crop treatment systems as described here can be mounted on other semi-automated or autonomous crop health monitoring vehicles, robots, or other mobile devices. For example, the mobile platform may be configured to move autonomously among plants or in response to commands from a controller, which in some embodiments is on-board the mobile system and in other embodiments is a component of an external data processing unit or other device or system. Thus, in some embodiments of the mobile crop monitoring and treatment systems described here, functions such as data collection, processing, and analysis and control of the system (including operation of the treatment system) is performed on-board the mobile system by one or more computer processors and control systems. In other embodiments, the mobile system is controlled entirely, or at least to some extent, remotely. One example of the latter is shown in FIG. 7.

Figure 7:
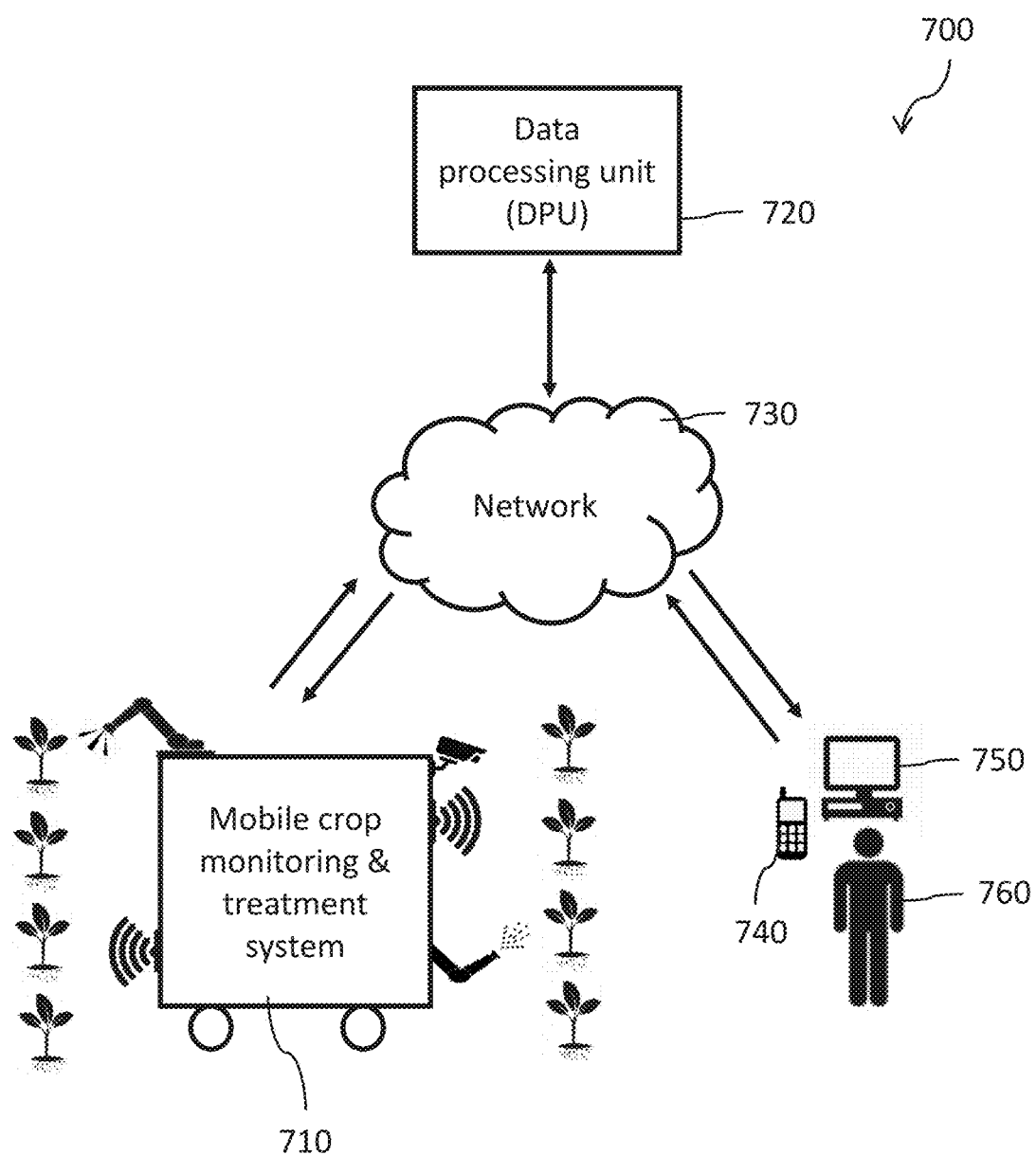
FIG. 7 illustrates an example crop management system that includes a mobile crop monitoring and treatment system in accordance with this disclosure.

FIG. 7 illustrates an example crop management system 700 that includes a mobile crop monitoring and treatment system in accordance with this disclosure. In the crop management system 700, at least some processing and analysis of sensor data and control of a mobile system is performed remotely. As shown in FIG. 7, the crop management system 700 includes a mobile crop monitoring and treatment system 710, which includes multiple sensors and one or more robotic arms for applying treatments to plants. The sensors and robotic arms can be mounted on, for example, a vehicle, cart, or drone. In some embodiments, the mobile system 710 may be the same as or similar to the mobile system 100 or 300 described above.

In the crop management system 700, the mobile crop monitoring and treatment system 710 captures sensor data related to plants in a crop. Some or all of the data can be transmitted to a data processing unit (DPU) 720 via a network 730. In some embodiments, the mobile system 710 represents one of multiple vehicles or robots, and these vehicles or robots may communicate and exchange information with one another as well as with the DPU 720. The DPU 720 analyzes the sensor data and sends information regarding the crop to an individual 760, such as a grower and/or other parties, via one or more end-user devices, such as a smartphone 740 and/or a computer 750. The DPU 720 may also send commands to the mobile crop monitoring and treatment system 710. The grower or other individuals 760 may also send information to the DPU 720 and/or send commands to the mobile system 710 via the network 730.

In FIG. 7, arrows are used to indicate transmission of sensor data and/or other information. In some embodiments, the crop management system 700 includes or supports a web-based and/or cloud-based system, where communications between the mobile system 710, the DPU 720, and the grower or other individuals 760 or devices is primarily or entirely through wireless communications.

Although FIG. 7 illustrates one example of a crop management system 700 that includes a mobile crop monitoring and treatment system, various changes may be made to FIG. 7. For example, various components shown in FIG. 7 may be combined, further subdivided, replicated, rearranged, or omitted and additional components may be added according to particular needs.

Note that, in some embodiments, the mobile crop monitoring and treatment systems described here are designed to operate in the dark, such as at night. This can be beneficial as it can reduce interference with other greenhouse or field operations. Also, in some cases, the sensor-based monitoring systems may operate with greater sensitivity at night, as plants tend to be dormant during periods of darkness. During the daytime, normal practices of staff tending to a crop might temporarily stress the plants, such as due to moving plant heads, removing shoots, picking fruits, and the like.

Also note that embodiments of the systems and methods described here may rely primarily on the detection (through sensors) and interpretation (through data analysis) of plant-based signals to provide information about crop health and to determine appropriate remediative treatments to be administered. In some embodiments, the sensors on the mobile sensory platforms are proximate to the plants during sensing and data capture but do not touch the plants or soil. Such non-contact monitoring can help to reduce the spread of pests and diseases.

Further, note that the systems and methods described here for monitoring and assessing crop health can provide rapid and sensitive screening of individual plant health and treatment of plants with reduced human labor and at a far greater speed than can be accomplished by humans manually. The systems and methods described here can be deployed outdoors (such as in a field or orchard) or indoors (such as in a greenhouse). The systems and methods have automated components but are flexible and can be modified to enhance the crop monitoring and treatment that they perform.

In addition, note that embodiments of the technology, devices, systems, and methods described here can be used separately or can be used in various combinations as desired. For example, any desired combination of features of the mobile systems 100, 300, 710 described above may be used in a specific implementation of a mobile system.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A mobile crop monitoring and treatment system comprising:
   a vehicle with a propulsion system;
   multiple sensors mounted on the vehicle, each sensor configured to capture data pertaining to at least one plant-related parameter when the sensor is positioned proximate to a plant in a crop;
   a storage system configured to house multiple treatment agents comprising at least one chemical pesticide and at least one biological control agent on-board the vehicle, wherein the at least one biological control agent comprises at least one living organism or natural product, rather than a chemical, that is capable of reducing or eliminating at least one pest or disease, and wherein the storage system comprises:
      at least one chemical pesticide container configured to house the at least one chemical pesticide;
      at least one biological control agent container configured to house the at least one biological control agent, wherein the at least one biological control agent container comprises an aerator or agitator configured to disperse the at least one biological control agent more uniformly within the at least one biological control agent container compared to dispersion of the at least one biological control agent within the at least one biological control agent container without aeration or agitation; and
      at least one carrier container configured to house at least one solvent or carrier;
   an application system configured to apply one or more of the treatment agents to the plant; and
   a controller configured to control movement of the vehicle and operation of the sensors and the application system, the controller configured to cause the application system to apply the one or more treatment agents to the plant in response to one or more signals from one or more of the sensors.

2. The mobile crop monitoring and treatment system of claim 1, wherein:
   the mobile crop monitoring and treatment system further comprises an on-board computer processor; and
   the controller is configured to cause the application system to apply the one or more treatment agents to the plant at a dosage and a concentration determined by the on-board computer processor in response to the one or more signals from the one or more sensors.

3. The mobile crop monitoring and treatment system of claim 1, wherein the application system comprises at least one robotic arm and at least one applicator.

4. The mobile crop monitoring and treatment system of claim 3, further comprising:
   at least one ultraviolet light positioned on the at least one robotic arm.

5. The mobile crop monitoring and treatment system of claim 1, wherein the controller is configured to cause the mobile crop monitoring and treatment system to:
   draw the at least one chemical pesticide from the at least one chemical pesticide container;
   draw the at least one solvent or carrier from the at least one carrier container; and
   combine the at least one chemical pesticide and the at least one solvent or carrier upstream of the application system.

6. The mobile crop monitoring and treatment system of claim 1, wherein:
the at least one chemical pesticide container comprises a multi-compartment container and a pump;
each compartment of the multi-compartment container is configured to house a different pesticide or pesticide component material; and
the controller is configured to cause the pump to selectively draw multiple pesticides or pesticide component materials from the multi-compartment container and mix the multiple pesticides or pesticide component materials in a mixing region.

7. The mobile crop monitoring and treatment system of claim 6, wherein the mixing region is upstream of the application system.

8. The mobile crop monitoring and treatment system of claim 6, wherein the mixing region is downstream of the application system.

9. The mobile crop monitoring and treatment system of claim 1, wherein the mobile crop monitoring and treatment system is a ground-based system.

10. The mobile crop monitoring and treatment system of claim 1, wherein the mobile crop monitoring and treatment system is an air-borne system.

11. The mobile crop monitoring and treatment system of claim 1, wherein the mobile crop monitoring and treatment system forms part of a robotic scout.

12. The mobile crop monitoring and treatment system of claim 1, wherein the mobile crop monitoring and treatment system forms part of a cart that is configured to be driven by an operator.

13. A method for treating a plant in a crop, the method comprising:
assessing a health of the plant in the crop by gathering sensor data using an automated vehicle equipped with multiple sensors;
processing the sensor data to determine a treatment to be applied to the plant in the crop;
dispensing the treatment from a storage system carried on-board the automated vehicle, the storage system housing at least one chemical pesticide and at least one biological control agent, wherein the at least one biological control agent is housed in a container in the storage system, and wherein the at least one biological control agent comprises at least one living organism or natural product, rather than a chemical, that is capable of reducing or eliminating at least one pest or disease;
agitating or aerating the at least one biological control agent so that the at least one biological control agent is more uniformly dispersed within the container compared to dispersion of the at least one biological control agent within the container without aeration or agitation; and
delivering the treatment to the plant in the crop via a robotic arm and an applicator carried on-board the automated vehicle;
wherein a concentration and a dosage of the treatment applied to the plant in the crop are controllable and adjustable by a controller on-board the automated vehicle.

14. The method of claim 13, wherein the sensor data is processed on-board the automated vehicle to determine the treatment to be applied to the plant in the crop.

15. The method of claim 13, wherein dispensing the treatment from the storage system comprises:
mixing multiple chemical pesticides or pesticide component materials drawn from the storage system with at least one carrier to provide a desired formulation.

16. The method of claim 13, wherein dispensing the treatment from the storage system comprises:
mixing multiple chemical pesticides or pesticide component materials drawn from the storage system with at least one carrier and with at least one adjuvant to provide a desired formulation.

17. A mobile crop monitoring and treatment system comprising:
a vehicle with a propulsion system;
multiple sensors mounted on the vehicle, each sensor configured to capture data pertaining to at least one plant-related parameter when the sensor is positioned proximate to a plant in a crop;
a storage system configured to house chemical pesticides and biological control agents on-board the vehicle, the storage system comprising multiple containers, at least one of the containers comprising multiple compartments, the compartments of the at least one of the containers collectively configured to store multiple materials including the chemical pesticides or pesticide component materials, the biological control agents, one or more solvents, and one or more adjuvants, wherein each of the biological control agents comprises a living organism or natural product, rather than a chemical, that is capable of reducing or eliminating at least one pest or disease, and wherein at least one of the containers for housing the biological control agents comprises an aerator or agitator configured to disperse the biological control agents more uniformly within the at least one of the containers compared to dispersion of the biological control agents within the at least one of the containers without aeration or agitation;
one or more applicators configured to apply one or more treatments to the plant;
one or more robotic arms configured to position at least one of the one or more applicators for application of the one or more treatments to the plant; and
a controller configured to control movement of the vehicle and operation of the mobile crop monitoring and treatment system, the controller configured to cause the one or more applicators to apply the one or more treatments to the plant in response to one or more signals from one or more of the sensors, wherein different treatments are associated with different materials or combinations of materials from the containers.

18. The mobile crop monitoring and treatment system of claim 17, further comprising:
a pump configured to selectively draw the multiple materials from each of the multiple compartments and mix the multiple materials in a mixing region.

19. The mobile crop monitoring and treatment system of claim 18, wherein the mixing region is upstream of the one or more applicators.

20. The mobile crop monitoring and treatment system of claim 18, wherein the mixing region is downstream of the one or more applicators.

* * * * *